(12) United States Patent  (10) Patent No.: US 8,489,155 B2
Hasegawa et al.  (45) Date of Patent: Jul. 16, 2013

(54) PORTABLE ELECTRONIC APPARATUS

(75) Inventors: Takashi Hasegawa, Kanagawa (JP);
Yasuhito Kanemaki, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 493 days.

(21) Appl. No.: 12/740,339

(22) PCT Filed: Oct. 30, 2008

(86) PCT No.: PCT/JP2008/069810
§ 371 (c)(1),
(2), (4) Date: May 12, 2010

(87) PCT Pub. No.: WO2009/057718
PCT Pub. Date: May 7, 2009

(65) Prior Publication Data
US 2010/0254076 A1 Oct. 7, 2010

(30) Foreign Application Priority Data
Oct. 30, 2007 (JP) ................................. 2007-281514

(51) Int. Cl.
*H04M 1/00* (2006.01)
(52) U.S. Cl.
USPC ................. 455/575.1; 455/575.3; 455/575.4; 455/575.5; 455/575.8; 455/566
(58) Field of Classification Search
USPC ............ 455/566, 575.1, 575.3, 575.4, 575.5, 455/575.8; 16/367; 361/679.06; 379/433.13
See application file for complete search history.

(56) References Cited

U.S. PATENT DOCUMENTS

| 2004/0246399 A1 | 12/2004 | Ahn |
| 2007/0197268 A1* | 8/2007 | Terada et al. ............... 455/575.3 |
| 2010/0248790 A1* | 9/2010 | Motonori et al. ............ 455/566 |

FOREIGN PATENT DOCUMENTS

| JP | 2003-174495 | | 6/2003 |
| JP | 2004-218688 | | 8/2004 |
| JP | 2004-326086 | | 11/2004 |
| JP | 2005-010699 | | 1/2005 |
| JP | 2005-220973 | A | 8/2005 |
| JP | 2005-311004 | | 11/2005 |
| JP | 2006010025 | * | 1/2006 |
| JP | 2006-010025 | | 12/2006 |
| JP | 2007-271062 | | 10/2007 |
| JP | 2007271063 | * | 10/2007 |

OTHER PUBLICATIONS

International Search Report for PCT/JP2008/069810 issued Dec. 22, 2008.
Notice of Reasons for Rejection dated Dec. 18, 2012 issued in counterpart Japanese Application No. 2007-281514.

* cited by examiner

*Primary Examiner* — Manpreet Matharu
(74) *Attorney, Agent, or Firm* — Procopio, Cory, Hargreaves & Savitch LLP

(57) ABSTRACT

A portable electronic apparatus provided with a biaxial hinge mechanism that connects a first body and a second body to be openable and closable and rotatable via a hinge portion that allows for a reduction in thickness in a thickness direction and a size of a set of the bodies in a closed state, while securing sufficient strength in the biaxial hinge mechanism.

12 Claims, 10 Drawing Sheets

PORTABLE ELECTRONIC APPARATUS

TECHNICAL FIELD

The present invention relates to a portable electronic apparatus such as a cellular telephone.

BACKGROUND ART

Conventionally, in a cellular telephone as a portable electronic apparatus, a biaxial hinge mechanism is used as a hinge portion in order to connect a plurality of bodies composed of a second body and a first body to be openable/closable and rotatable. The biaxial hinge mechanism includes a first axial hinge for opening and closing the second body and the first body and a second axial hinge for rotating the first body, in which the second body is fixed to the first axial hinge and the first body is fixed to the second axial hinge. Such a conventional structure is disclosed in the following patent Documents.

Patent Documents 1 to 3 disclose a threaded fixing mechanism in a direction orthogonal to a rotational axis of the second axial hinge. Patent Document 4 discloses a threaded fixing mechanism in a direction parallel to the rotational axis of the second axial hinge.

Patent Document 1: Japanese Unexamined Patent Application, Publication No. 2004-218688
Patent Document 2: Japanese Unexamined Patent Application, Publication No. 2005-311004
Patent Document 3: Japanese Unexamined Patent Application, Publication No. 2006-10025
Patent Document 4: Japanese Unexamined Patent Application, Publication No. 2003-174495

DISCLOSURE OF THE INVENTION

Problems to be Solved by the Invention

However, in the above-identified Patent Documents, since one of the axial hinges (the second axial hinge) in the biaxial hinge mechanism that connects two bodies is fixed by threads in a thickness direction of a set of the second body and the first body (in an overlapping direction of the bodies), a thickness in the thickness direction of the set of the bodies increases, thereby preventing a reduction in thickness of the electronic apparatus. In addition, the biaxial hinge mechanism is formed by modularizing by die-casting with magnesium or the like; however, there is a limitation in reducing the thickness of a modular structure from a viewpoint of securing strength thereof. Therefore, there is a restriction in reduction in thickness and size of the electronic apparatus.

The present invention aims at providing a portable electronic apparatus provided with a biaxial hinge mechanism that connects a first body and a second body to be openable and closable and rotatable via a hinge portion that allows for a reduction in thickness in a thickness direction and a size of a set of the bodies in a closed state, while securing sufficient strength in the biaxial hinge mechanism.

Means for Solving the Problems

The present invention relates to a portable electronic apparatus including: a first body that is a substantially flat plate shape; and a second body that is connected to the first body via a hinge portion, in which: the hinge portion includes a first rotational axis that makes the first body transition between an opened state and a closed state with respect to the second body, and a second rotational axis that rotates the first body with respect to the second body about an axis orthogonal to the first rotational axis, such hinge is configured by providing a fixed portion that extends in a direction orthogonal to an axial direction of the second rotational axis and rotates by way of the second rotational axis; the second body is fixed to the hinge portion so as to rotate about the first rotational axis; and the first body is fixed to the hinge portion so as to be rotatable about the second rotational axis by tightening together the fixed portion to a component constituting the first body with a screw in a direction orthogonal to a thickness direction of the first body.

In addition, the screw is used plural number.

In addition, the fixed portion preferably includes threaded holes at point-symmetrical positions about the second rotational axis.

In addition, both end portions of the fixed portion in a direction orthogonal to the axial direction of the second rotational axis preferably extend inside the first body in a direction parallel to the second rotational axis.

In addition, the fixed portion is preferably a component that can be obtained by bending a metal plate of which a thickness direction is in the axial direction of the second rotational axis.

In addition, the fixed portion is preferably formed in a shape that is symmetrical about the axial direction of the second rotational axis and that surrounds at least a portion of an inner component of the first body.

In addition, the inner component is preferably a display.

In addition, both end portions of the fixed portion in a direction orthogonal to the axial direction of the second rotational axis preferably extend inside the first body in a direction parallel to the second rotational axis.

In addition, the fixed portion is preferably a component that can be obtained by bending a metal plate of which a thickness direction is in the axial direction of the second rotational axis.

In addition, the fixed portion is preferably formed in a shape that is symmetrical along the axial direction of the second rotational axis and that surrounds at least a portion of an inner component of the first body.

In addition, the inner component is preferably a display.

In addition, the present invention relates to a portable electronic apparatus including: a first body that is a substantially flat plate shape; and a second body that is connected to the first body via a hinge portion, in which: the hinge portion includes a first rotational axis that makes the first body transition between an opened state and a closed state with respect to the second body, and a second rotational axis that rotates the first body with respect to the second body about an axis orthogonal to the first rotational axis, such hinge is configured by providing a fixed portion that extends in a direction orthogonal to an axial direction of the second rotational axis and rotates about the second rotational axis; the second body is fixed to the hinge portion so as to rotate about the first rotational axis; the fixed portion is formed in a shape that is symmetrical along the axial direction of the second rotational axis and that surrounds at least a portion of an inner component of the first body; and the first body is fixed to the hinge portion so as to be rotatable about the second rotational axis by fixing the fixed portion to the first body.

In addition, the fixed portion preferably includes threaded holes at point-symmetrical positions about the second rotational axis and is fixed by threads to a component constituting the first body.

In addition, both end portions of the fixed portion preferably extend inside the first body in a direction parallel to the second rotational axis.

In addition, the fixed portion is preferably a component that can be obtained by bending a metal plate of which a thickness direction is in the axial direction of the second rotational axis.

Effects of the Invention

The present invention can provide a portable electronic apparatus provided with a biaxial hinge mechanism that connects a first body and a second body to be openable/closable and rotatable, in which a thickness in a thickness direction and a size of a set of the bodies in a closed state can be reduced, while securing sufficient strength of the biaxial hinge mechanism.

PREFERRED MODE FOR CARRYING OUT THE INVENTION

An embodiment of the present invention is described hereinafter with reference to the drawings. It should be noted that, although a cellular telephone is described hereinafter as a mobile electronic apparatus, the present invention is not limited thereto and may be PHS (Personal Handyphone System), a PDA (Personal Digital Assistant), a portable navigation apparatus, a laptop computer, and the like.

Figure 1:
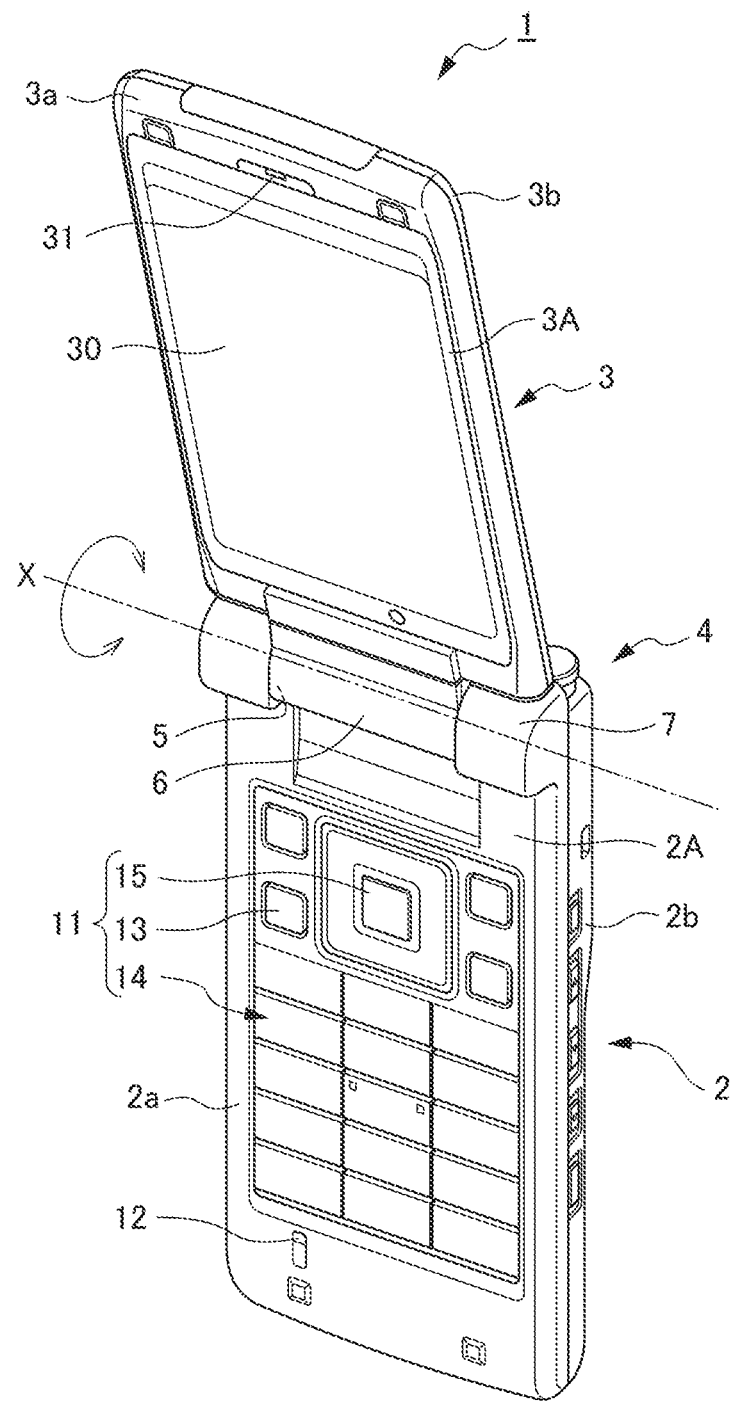
FIG. 1 is a perspective view of a cellular telephone as a first embodiment of a portable electronic apparatus according to the present invention in an opened state.
Figure 2:
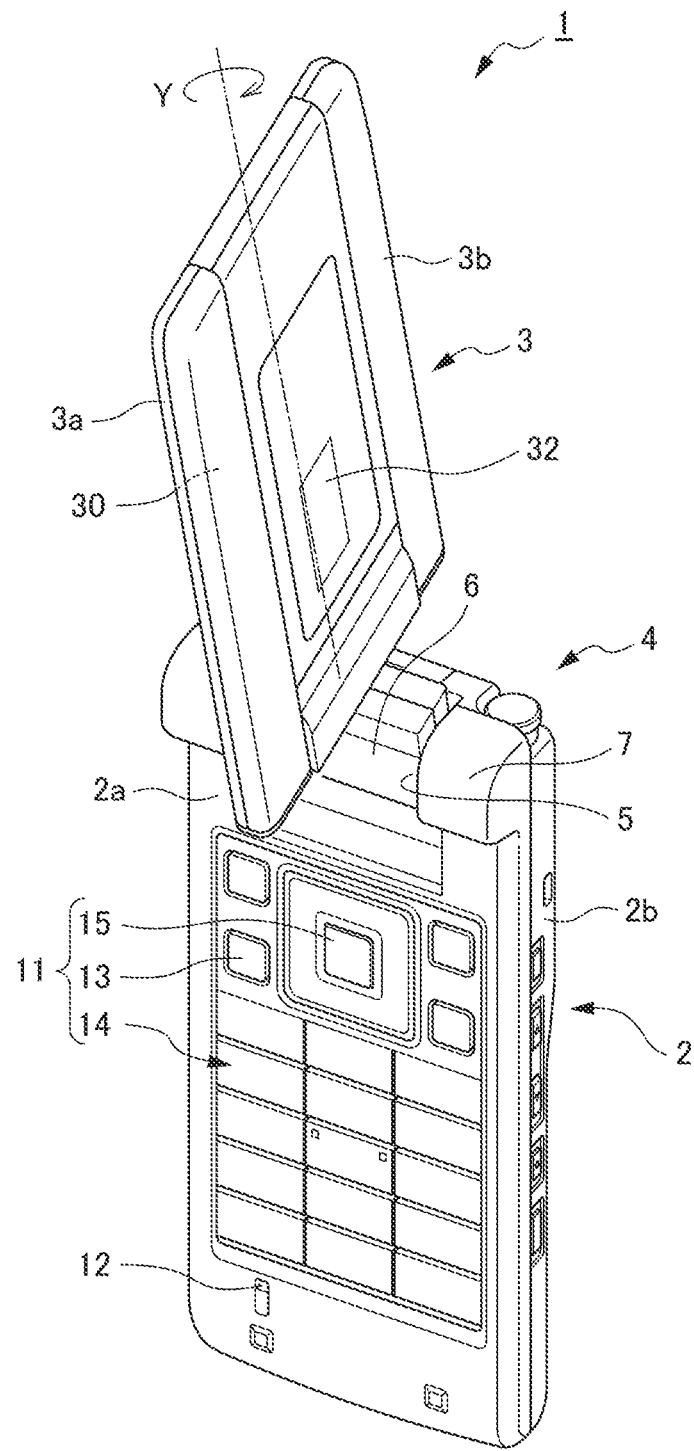
FIG. 2 is a perspective view showing the cellular telephone shown in FIG. 1 in a state in which a display unit side body is being pivoted.
Figure 3:
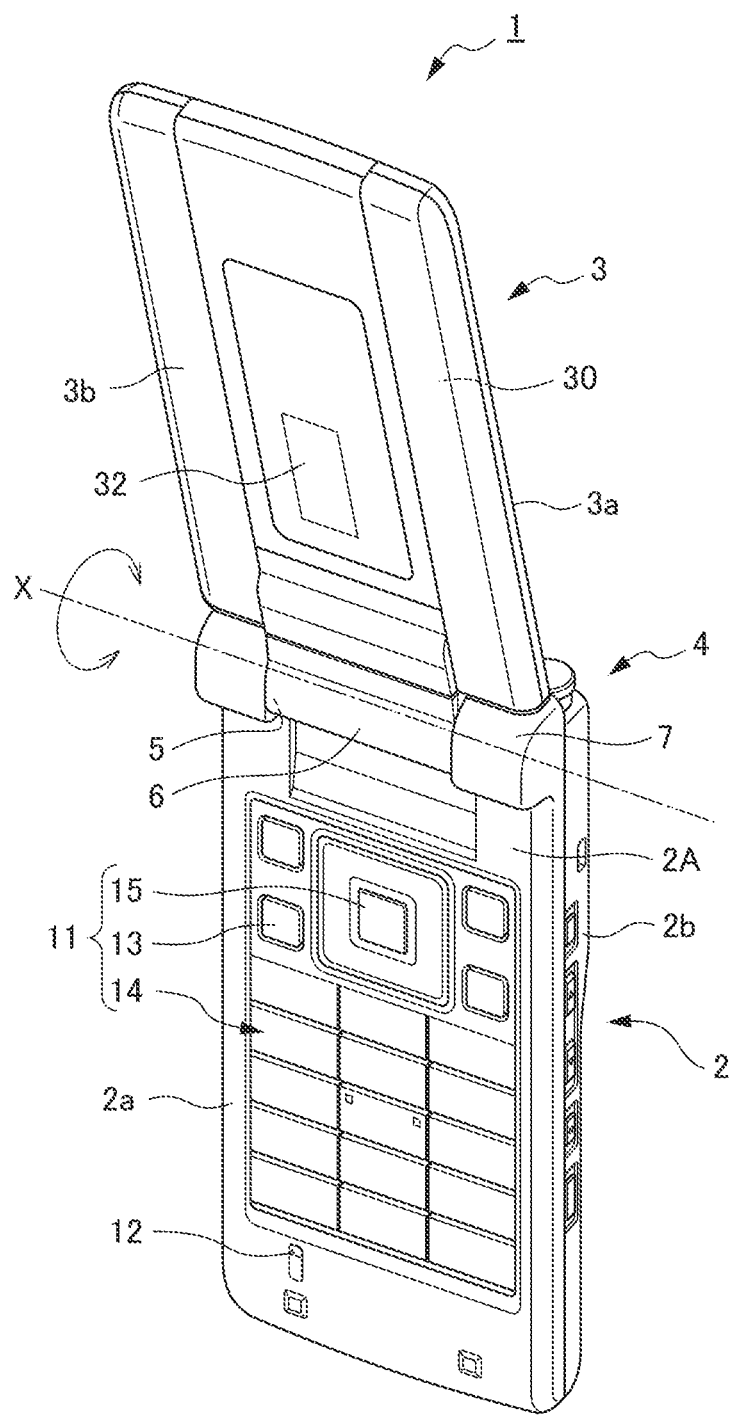
FIG. 3 is a perspective view showing the cellular telephone shown in FIG. 1 in a state in which the display unit side body has been pivoted.
Figure 4:
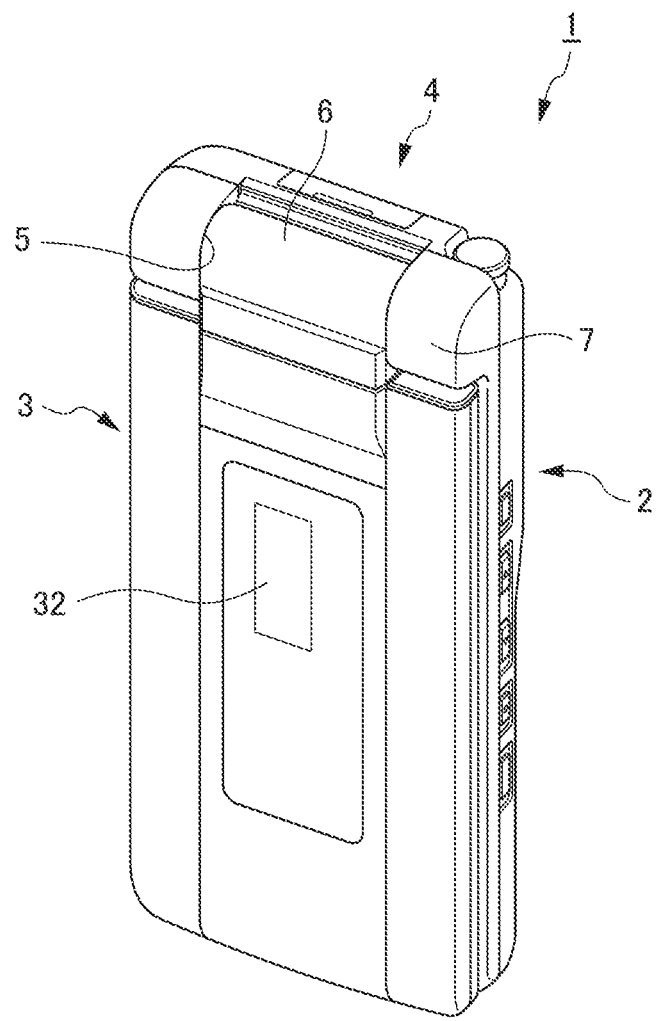
FIG. 4 is a perspective view showing the cellular telephone shown in FIG. 1 in a closed state.
Figure 5:
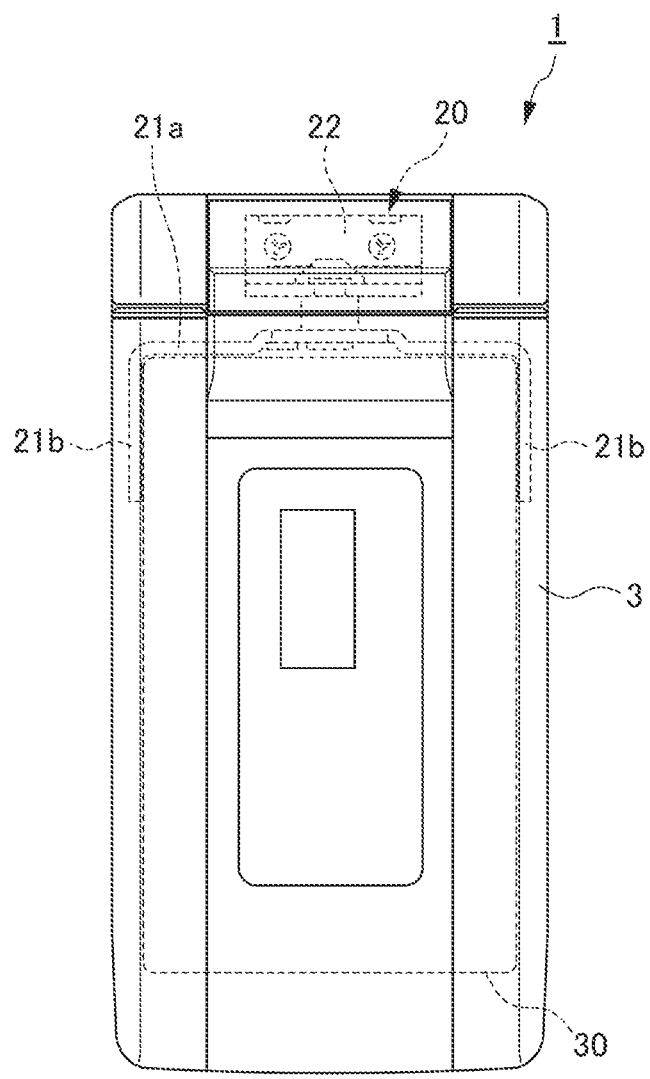
FIG. 5 is a front view showing the cellular telephone shown in FIG. 1 in a closed state.

A basic configuration of a cellular telephone 1 as a portable electronic apparatus is described with reference to the FIGS. 1 to 5. FIG. 1 is a perspective view of a cellular telephone 1 as a first embodiment of a portable electronic apparatus according to the present invention in an opened state (a first opened state). FIG. 2 is a perspective view of the cellular telephone 1 shown in FIG. 1 in a state in which a display unit side body 3 is pivoted at a predetermined angle around a pivot axis Y of a connecting portion 4. FIG. 3 is a perspective view showing a state in which the display unit side body 3 has been pivoted in the first opened state shown in FIG. 1. FIG. 4 is a perspective view of the cellular telephone 1 in a closed state in which the display unit side body 3 is placed over an operation unit side body 2. FIG. 5 is a front view of the cellular telephone 1 in a closed state.

The cellular telephone 1 of the present embodiment includes the operation unit side body 2 as a second body and the display unit side body 3 as a first body. The operation unit side body 2 and the display unit side body 3 are connected via the connecting portion 4 provided with a biaxial hinge mechanism. The connecting portion 4 makes the cellular telephone 1 switchable between the opened state and the closed state, and allows for switching of the display unit side body 3 between a front side state and a back side state both in the opened state and the closed state.

Here, the closed state is a state in which the bodies 2 and 3 are disposed so as to overlap each other. The opened state is a state in which the bodies 2 and 3 are disposed so as not to overlap each other. Here, the front side state in the opened state refers to a state in which a display 30 disposed on a front face 3A of the display unit side body 3 (described later) and the operation key group 11 disposed on the front face 2A of the operation unit side body 2 are disposed so as to face the same side (see FIG. 1). In addition, the back side state in the opened state refers to a state in which the display 30 in the display unit side body 3 and the operation key group 11 in the operation unit side body 2 are disposed so as to face opposite sides (see FIG. 3). Moreover, the front side state in the closed state refers to a state in which the display 30 in the display unit side body 3 is disposed to oppose the operation key group 11 in the operation unit side body 2 (see FIGS. 4 and 5). Furthermore, the back side state in the closed state refers to a state in which the display 30 in the display unit side body 3 is exposed without opposing the operation key group 11 in the operation unit side body 2.

The operation unit side body 2 as the second body has an outer surface composed of a front case 2a and a rear case 2b. The operation unit side body 2 is configured to expose both an operation key group 11 on the front case 2a side and a sound input unit 12 where the sound of the user of the cellular telephone 1 is input when conversing. Here, the operation key set 11 is composed of: a function setting operation keys 13 for operating various functions such as for various settings, a telephone number directory function and a mail function; an input operation key 14 such as ten keys for inputting digits of a telephone number and characters for mail, and a selection operation key 15 that performs confirmation of the various operations and scrolls up, down, left and right. The sound input unit 12 is disposed on an outer end portion side that is opposite to the connecting portion 4 side in a longitudinal direction of the operation unit side body 2. In other words, the sound input unit 12 is disposed in a first outer end portion side in the longitudinal direction of the operation unit side body 2 in the opened state of the cellular telephone 1.

Selected features are assigned to each of the keys (key assignment) composing the operation key set 11 according to a deformed state of the operation unit side body 2 and the display unit side body 3, such as the opened or closed state, the front side or back side state and the like, and the type of application that is running. An operation corresponding to a feature assigned to each key is executed by a user pressing one of the keys composing the operation key set 11 of the cellular telephone 1.

The display unit side body 3 as the first body has an outer surface composed of a front case 3a and a rear case 3b and is substantially flat plate shaped. A display 30 (a first display) of a predetermined shape for displaying a variety of information, and a sound output unit 31 that outputs sound of the other party of the conversation are disposed to be exposed in the front case 3a of the display unit side body 3. The sound output unit 31 is disposed on an outer end portion side that is opposite to the connecting portion 4 in the longitudinal direction of the display unit side body 3. In other words, the sound output unit 31 is disposed in a second outer end portion side in the opened state of the cellular telephone 1.

A sub-display 32 (a second display) for displaying a variety of information is disposed to be exposed on the rear case 3b of the display unit side body 3. The display 30 and sub-display 32 are composed of a liquid crystal display panel, a drive circuit that drives the liquid crystal display panel, and a light source unit such as a backlight that irradiates light from the back face side of the liquid crystal display panel. It should be noted that the display 30 and sub-display 32 can be configured from organic EL displays.

The connecting portion 4 includes a biaxial hinge mechanism 20. The biaxial hinge mechanism 20 is a connecting mechanism that connects the display unit side body 3 and the operation unit side body 2 to be openable and closable about an opening-and-closing axis X as a first rotational axis at an arbitrary angle, while being connected to be pivotable about a pivot axis Y at an arbitrary angle. The biaxial hinge mechanism 20 is provided inside a hinge case 6. The hinge case 6 is disposed on a lower end side of the display unit side body 3. In an upper end portion of the operation unit side body 2, a notch portion 5 into which the hinge case 6 is inserted is formed. Both sides of the notch portion 5 are shoulder portions 7. The hinge case 6 is inserted into the notch portion 5 so as to be interposed between the shoulder portions 7.

As described above, in the cellular telephone 1, the operation unit side body 2 and the display unit side body 3 are connected by the biaxial hinge mechanism 20 of the connecting portion 4 so as to be openable and closable, and pivotable. In such a configuration, the cellular telephone 1 can be transformed into various states by opening and closing the operation unit side body 2 and the display unit side body 3 about the opening and closing axis X, and pivoting about the pivot axis Y.

For example, the cellular telephone 1 in the closed state (the first closed state) in which the operation unit side body 2 and the display unit side body 3 overlap each other can be switched into the opened state (the first opened state) in which the operation unit side body 2 and the display unit side body 3 do not overlap each other by transforming the cellular telephone 1 to open about the opening and closing axis X such that respective end portions, which are on opposite sides of the opening and closing axis X, of the operation unit side body 2 and the display unit side body 3 are spaced apart from each other.

On the other hand, the cellular telephone 1 in the opened state (the first opened state) can be switched to the closed state (the first closed state) by transforming the cellular telephone 1 to close about the opening and closing axis X such that respective end portions, which are on opposite sides of the opening and closing axis X, of the operation unit side body 2 and the display unit side body 3 approach each other.

In addition, in the opened state (the first opened state), the display unit side body 3 can pivot about the pivot axis Y as shown in FIG. 2. Moreover, by further pivoting the display unit side body 3 about the pivot axis Y, the display unit side body 3 can be switched between the front side state and the back side state. More specifically, the opened state (the first opened state) in which the display 30 disposed on the front face 3A of the display unit side body 3 and the operation key group 11 disposed on the front face 2A of the operation unit side body 2 face to the same side can be switched into the opened state (the second opened state) in which the display 30 disposed on the front face 3A of the display unit side body 3 and the operation key group 11 disposed on the front face 2A of the operation unit side body 2 face opposite sides.

In addition, the cellular telephone 1 can be switched into the closed state (the second closed state) by transforming the display unit side body 3 to close about the opening and closing axis X. In other words, the cellular telephone 1 can be switched from the closed state in which the display 30 in the display unit side body 3 is disposed to oppose the operation key group 11 in the operation unit side body 2 (the first closed state) to the closed state in which the display 30 in the display unit side body 3 is exposed without opposing the operation unit side body 2 (the second closed state, a turned-closed state).

Figure 6:
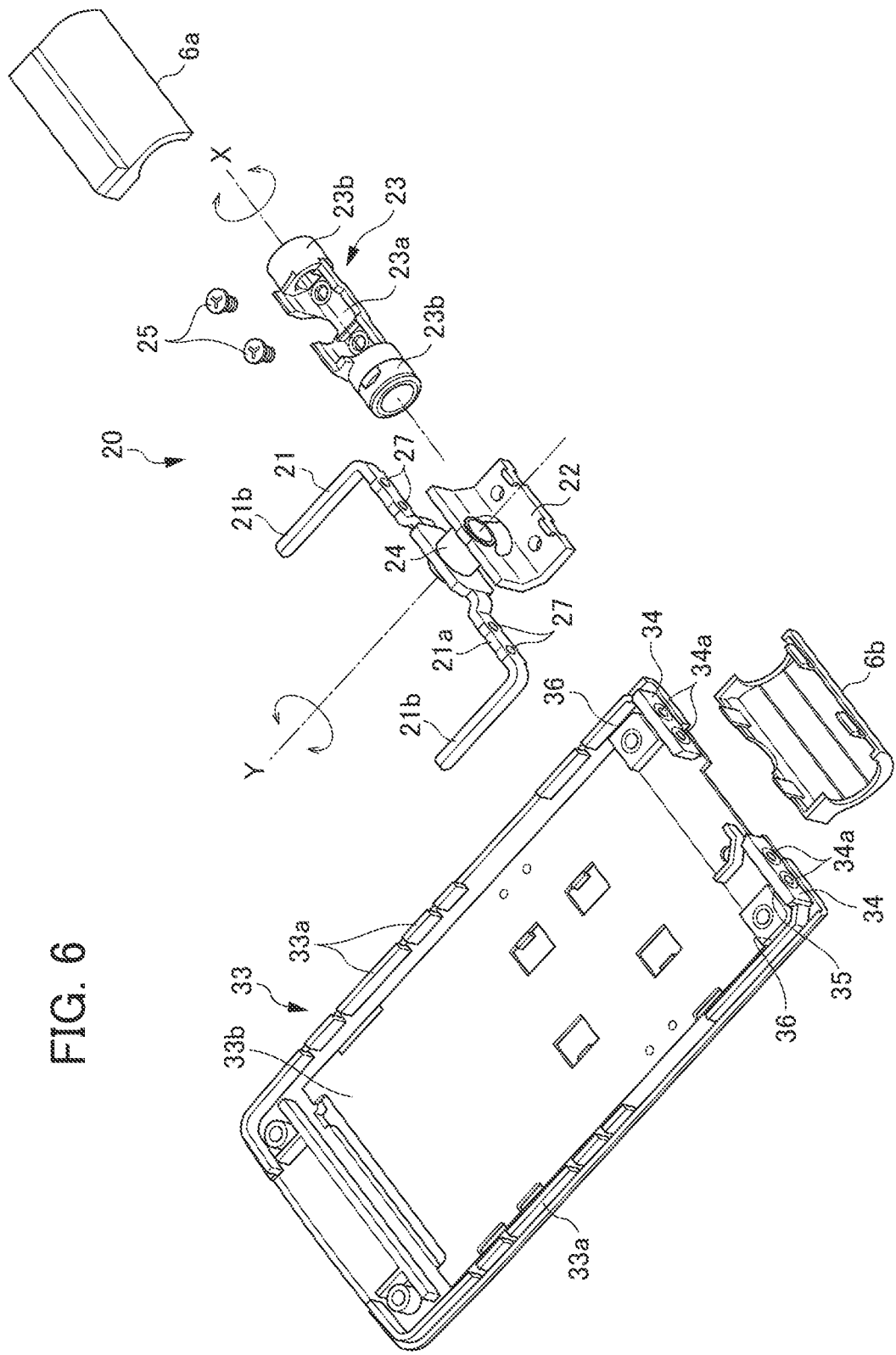
FIG. 6 is an exploded perspective view showing an installation structure of a biaxial hinge mechanism of the cellular telephone shown in FIG. 1.
Figure 7:
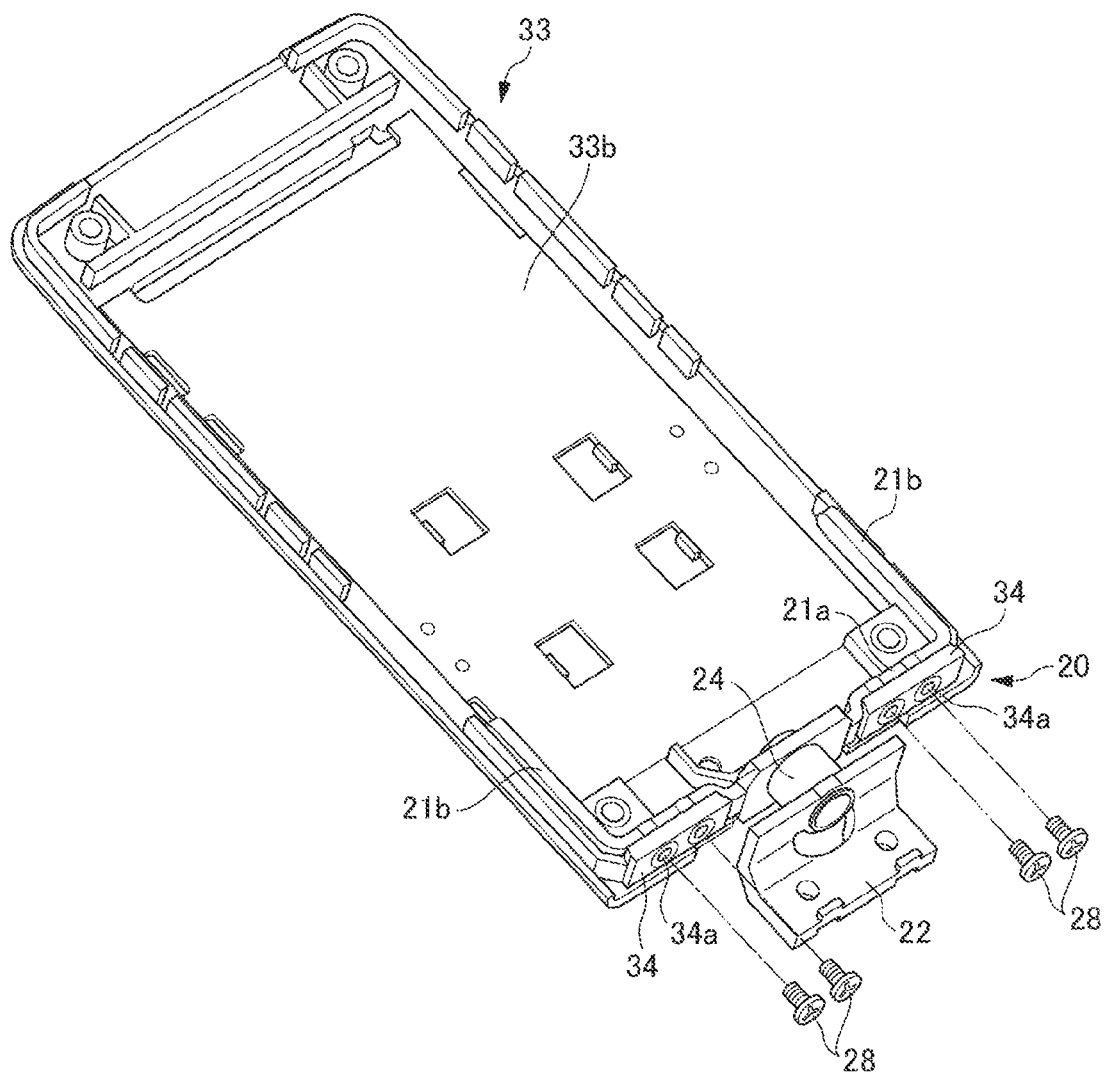
FIG. 7 is a perspective view showing installation of the biaxial hinge mechanism to the display unit side body of the cellular telephone shown in FIG. 1.
Figure 8:
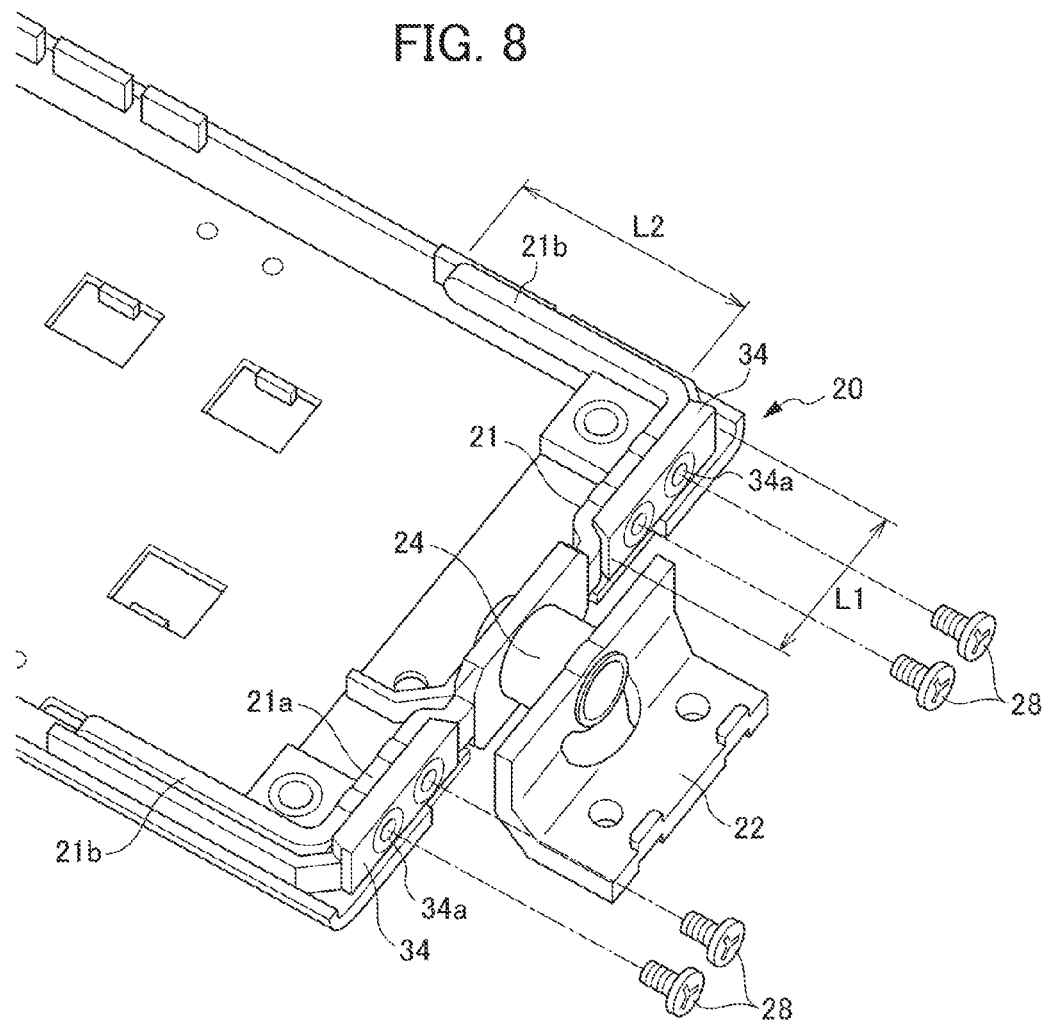
FIG. 8 is a partially enlarged perspective view of FIG. 7.
Figure 9:
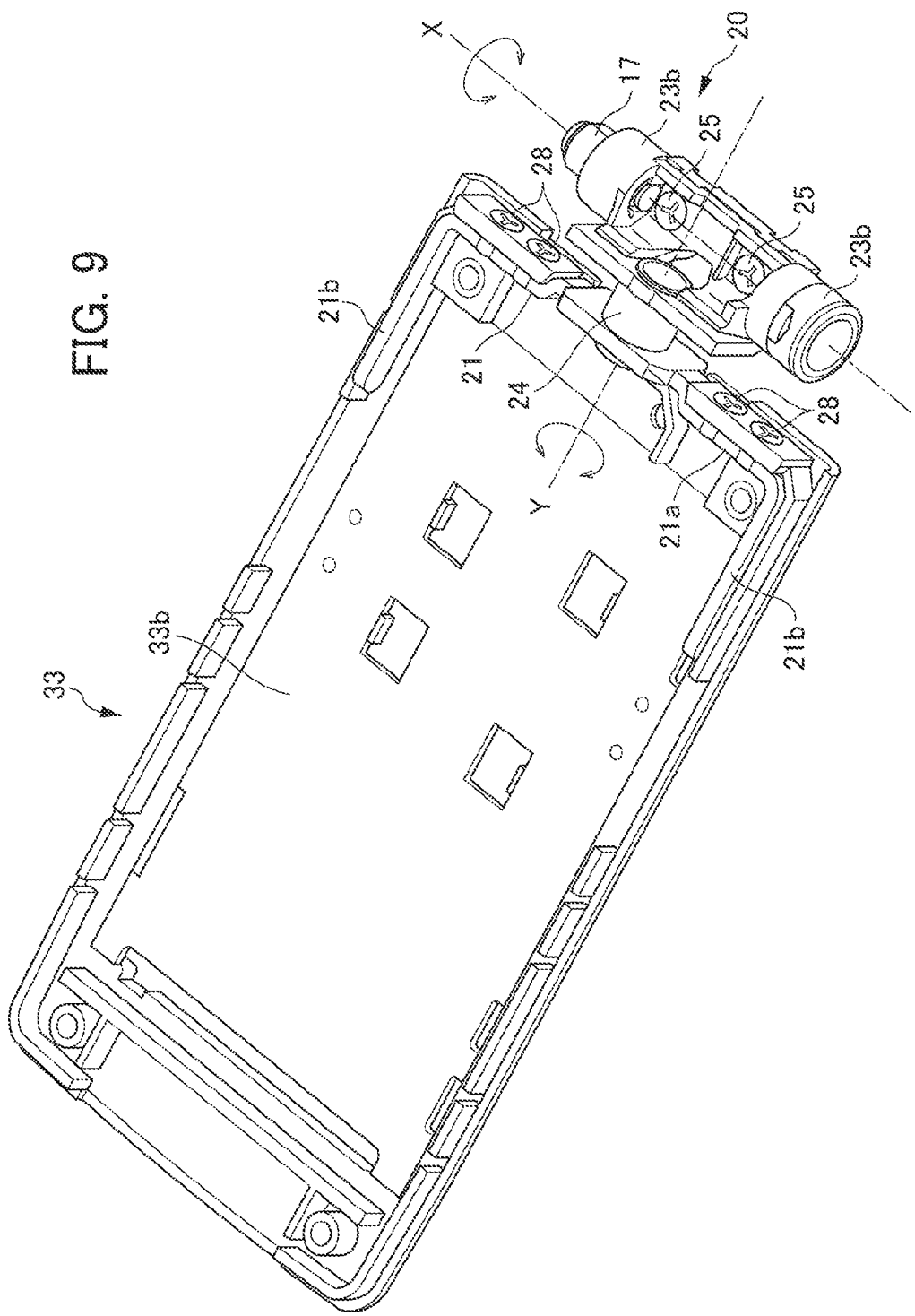
FIG. 9 is a perspective view showing the cellular telephone shown in FIG. 1 in a state in which the biaxial hinge mechanism is installed on the display unit side body thereof.
Figure 10:
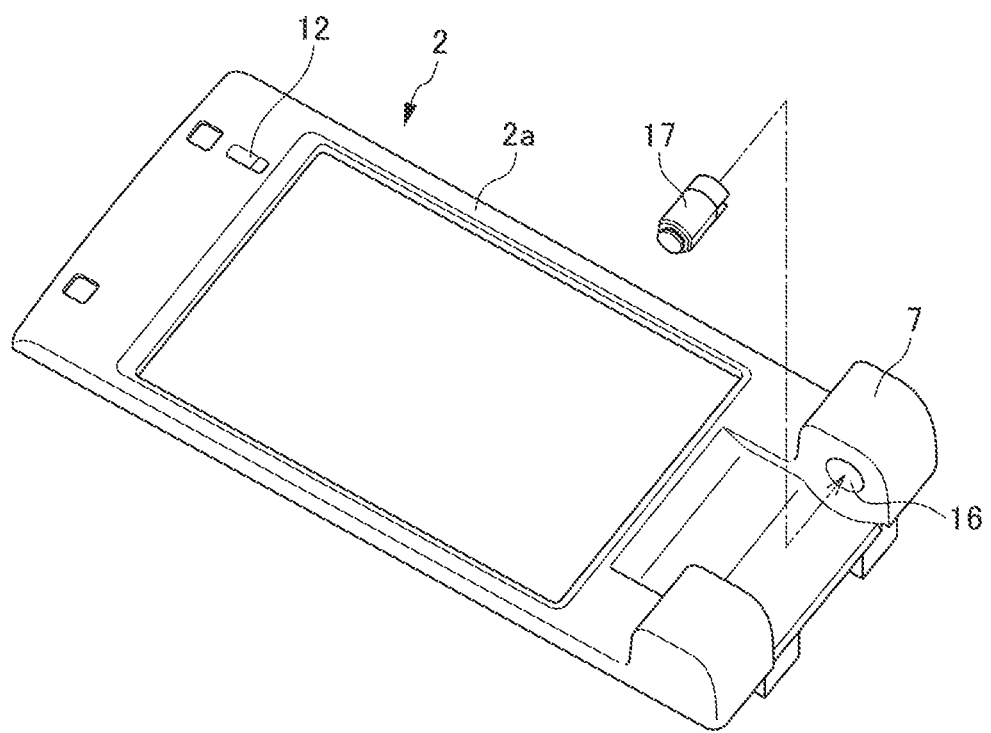
FIG. 10 is a perspective view showing a connection between the biaxial hinge mechanism and an operation unit side body of the cellular telephone shown in FIG. 1.

A structure of the biaxial hinge mechanism 20 is described with reference to FIGS. 6 to 10. FIG. 6 is an exploded perspective view of the biaxial hinge mechanism 20. FIG. 7 is a perspective view showing a fixing structure of the biaxial hinge mechanism 20. FIG. 8 is a partially enlarged perspective view of FIG. 7. FIG. 9 is a perspective view showing a fixed state of the biaxial hinge mechanism 20. FIG. 10 is a perspective view showing a support structure of the opening and closing axis X of the biaxial hinge mechanism 20 in the operation unit side body 2.

As shown in FIG. 6, the biaxial hinge mechanism 20 includes a connection arm 21 as a fixed portion, a connection bracket 22 having an L-shape for attaching the connection arm 21, and a connection tube 23 that is fixed to the connection bracket 22 with a plurality of screws 25. The connection arm 21 and the connection bracket 22 are connected with each other with a pivotal shaft 24 that is short bar shaped. The connection arm 21 is rotatable with respect to the connection bracket 22 via the pivotal shaft 24. In addition, the pivotal shaft 24 is rotatable with respect to the connection bracket 22 and extends in a direction of the pivot axis Y as a second rotational axis. The pivotal shaft 24 is thus a component of the rotation axis Y. In such a structure, the pivotal shaft 24 rotates with respect to the connection bracket 22, and thus the connection arm 21 can pivot about the pivot axis Y (the pivotal shaft 24). This allows relative rotation of the display unit side body 3 and the operation unit side body 2 in the opened state.

The connection tube 23 extends in a direction that is orthogonal to an axial direction of the pivotal shaft 24. Therefore, the connection tube 23 extends in an axial direction of the opening and closing axis X as the first rotational axis. The connection tube 23 includes a fixing piece 23a and tubular pieces 23b that are integrally formed on both sides of the fixing piece 23a. The connection bracket 22 is fixed by threads to the fixing piece 23a, and the connection bracket 22 is supported by fixing by threads. The connection tube 23 is connected to the operation unit side body 2 via the tubular pieces 23b.

As shown in FIG. 10, in an upper end portion of the front case 2a of the operation unit side body 2, the left and right shoulder portions 7 are formed and a supporting hole 16 is formed on opposite faces of the left and right shoulder portions 7. The reference numeral "17" represents an axial module. The axial module 17 has an outer shape such as a non-circular shape that would be obtained by parallel cutting a tubular shape. As shown in FIG. 9, a base portion of the axial module 17 is inserted into the first tubular piece 23b of the connection tube 23. The connection tube 23 can relatively rotate about the axial module 17. As shown in FIG. 10, a tip portion of the axial module 17 is inserted into the front case 2a of the operation unit side body 2 and fixed to the front case 2a. As a result, the operation unit side body 2 thus rotates about a hinge axis, which is the first tubular piece 23b on a side to the axial module 17. In other words, the operation unit side body 2 rotates about the connection tube 23, thereby opening and closing the bodies 2 and 3. It should be noted that, the second tubular piece 23b, into which the axial module 17 is not inserted, is inserted into a hole portion (not shown) in the second shoulder portion 7 of the front case 2a and supports the front case 2a.

The connection bracket 22 and the connection tube 23 are disposed inside the hinge case 6. As shown in FIG. 6, the hinge case 6 is composed of a hinge front case 6a and a hinge rear case 6b, which are halves. An assembled body of the connection bracket 22 and the connection tube 23 is housed inside the hinge case 6 by inserting the connection bracket 22 and the connection tube 23 assembled with the screws 25 between the hinge front case 6a and the hinge rear case 6b and then closing the hinge front case 6a and the hinge rear case 6b. In a state where the assembled body of the connection bracket 22 and the connection tube 23 is disposed inside the hinge case 6, the tip portion of the axial module 17 and the second tubular piece 23b project outward in an axial direction (in a direction of the opening and closing axis X) from both end faces of the hinge case 6, and portions thus projecting connect the hinge case 6 to the operation unit side body 2.

The connection arm 21 of the biaxial hinge mechanism 20 functions as the fixed portion and is channel-shaped as shown in FIGS. 6 to 9. The connection arm 21 is composed of a support arm portion 21a that extends in a direction orthogonal to the pivot axis Y as the second rotational axis, and holding arm portions 21b that are bent at a substantially right angle from both end portions of the support arm portion 21a. The support arm portion 21a is a flat plate portion, and a central portion thereof in a longitudinal direction is fixed to the pivotal shaft 24. The entirety of the connection arm 21 rotates integrally with the pivotal shaft 24 in accordance with rotation of the pivotal shaft 24. Since the connection arm 21 extends in a direction orthogonal to the pivot axis Y, the connection arm 21 rotates in the axial direction of the pivot axis Y.

As shown in FIGS. 6 to 8, the support arm portion 21a of the connection arm 21 includes threaded holes 27 at point-symmetrical positions along the pivotal shaft 24. In the present embodiment, two threaded holes 27 are formed at each of the symmetrical positions along the pivotal shaft 24. As shown in FIGS. 7 and 8, a fastening screw 28 is threaded into each of the threaded holes 27, thereby connecting the biaxial hinge mechanism 20 with the display unit side body 3. With such a connection by the threaded holes 27 positioned point-symmetrically, equal fixing power can be applied to right and left sides of the display unit side body 3.

The connection arm 21 is formed by processing to fold a metal plate. In other words, by pressing to fold a bar-shaped metal plate of a predetermined length, of which the thickness direction is the axial direction of the pivot axis Y, the support arm portion 21a and the holding arm portions 21b that extend from both end portions of the support arm portion 21a along the pivot axis Y are formed. In such processing, the connection arm 21 can be formed by performing processing to fold only once, thereby securing a predetermined strength even if the connection arm 21 is small in thickness. It should be noted that the connection arm 21 is disposed so as to surround one of the internal components built into the display unit side body 3. More specifically, as shown in FIG. 5, the connection arm 21 is disposed so as to surround three sides of the display 30, which is rectangularly shaped. As a result, an effect of preventing distortion of an internal component surrounded by the connection arm 21, such as the display 30, can also be obtained, even in a case where an external force is applied to the display unit side body 3.

As shown in FIGS. 6 to 9, the display unit side body 3 has a support frame 33 (the front case 3a) as one of the body pieces composing the body. The display 30, as a component of the display unit side body 3, is fitted and fixed into a first face (a lower face) of the support frame 33 (the front case 3a). In addition, a sub display 32 is attached to a second face (an upper face) of the support frame 33.

The support frame 33 is entirely formed of a metal plate member and secures rigidity against a bending operation and a twisting operation on the display unit side body 3 and functions as a shield against static electricity. In the present embodiment, the support frame 33 is formed by resin insert molding of the metal plate member. As described above, since the support frame 33 is formed not only of resin but by insert molding of the metal plate member, a predetermined strength can be maintained even if the display unit side body 3 is made thin.

The support frame 33 is formed in an elongated rectangular shape, and a plurality of teeth portions 33a are formed at a plurality of positions in both side end portions on a longitudinal side of the support frame 33. The display unit side body 3 is assembled by first placing a substrate and the sub display 32 inside a region surrounded by the teeth portions 33a, and then engaging the rear case 3b with the front case 3a. The biaxial hinge mechanism 20 is connected to a first end portion on a lateral side of the support frame 33 (a lower end portion in FIGS. 6 to 8).

In the first end portion on the lateral side of the support frame 33, a connection wall portion 34 is formed. The connection wall portion 34 is obtained by forming a resin mold layer on a portion of a resin insert molded metal plate member that is bent at a predetermined position. The connection wall portion 34 is formed to stand integrally from a frame face 33b of the support frame 33. The connection wall portion 34 is provided at symmetrical positions along a center line in the axial direction of the support frame 33. Each of the connection wall portions 34 extends in a direction orthogonal to the pivot axis Y as the second rotational axis. Each of the connection wall portions 34 has two threaded holes 34a into which the fastening screw 28 is threaded. The threaded hole 34a penetrates in a thickness direction of the connection wall portion 34 and a penetrated end thereof corresponds to a holder (not shown) for fixing the display 30. The holder has a threaded hole into which the fastening screw 28 is threaded. By threading the fastening screw 28 into the support arm portion 21a of the biaxial hinge mechanism 20 and the connection wall portion 34 of the support frame 33, the fastening screw 28 is threaded into the threaded hole of the holder. The display 30 can thus be fixed onto the support frame 33.

A fitting groove 35 is formed on an inner side of the support frame 33 by press-processing of the metal plate member (see FIG. 6). The fitting groove 35 is provided along a longitudinal direction of the connection wall portion 34. The support arm portion 21a of the connection arm 21 in the biaxial hinge mechanism 20 is fitted into the fitting groove 35. In the present embodiment, sub fitting grooves 36 along a longitudinal direction of the support frame 33 are communicatively connected to both end portions of the fitting groove 35. The sub fitting grooves 36 extend from an end portion of the fitting groove 35, in a direction orthogonal to the fitting groove 35. The holding arm portions 21b of the connection arm 21 in the biaxial hinge mechanism 20 are fitted into the sub fitting grooves 36.

Next, an assembly procedure of the present embodiment is described. First, the biaxial hinge mechanism 20 in a disassembled state shown in FIG. 6 is assembled. Then, the biaxial hinge mechanism 20 is fixed to the support frame 33 of the display unit side body 3. This fixing is realized by fitting the support arm portion 21a of the connection arm 21 into the fitting groove 35 of the support frame 33 while fitting the holding arm portions 21b into the sub fitting grooves 36 of the support frame 33. Thereafter, as shown in FIGS. 7 and 8, the fastening screws 28 are threaded from a side of the connection wall portion 34. The fastening screws 28 penetrate the threaded holes 34a of the connection wall portion 34 and the threaded holes 27 in the support arm portion 21a, and are threaded thereto. The fastening screws 28 thus realize fixing by threads in a direction orthogonal to a thickness direction of the display unit side body 3, thereby tightening together the display 30 and the biaxial hinge mechanism 20. In this case, a screw (not shown) may be threaded into the holding arm portions 21b fitted into the sub fitting grooves 36, thereby fixing side faces of the display 30. The coupling force between the connection arm 21 and the support frame 33 can thus be increased.

According to the present embodiment, the display 30, which is a component of the display unit side body 3, and the support arm portion 21a, which is the fixed portion of the biaxial hinge mechanism 20, can be tightened together by fixing by threads of the fastening screws 28 in a direction orthogonal to a thickness direction of the display unit side body 3. With such a structure of tightened together the fastening screws 28 in a direction orthogonal to a thickness direction of the display unit side body 3, the cellular telephone 1 can be provided in which the display unit side body 3 can be reduced in thickness in a thickness direction and in size.

Since the connection arm 21 of the biaxial hinge mechanism 20 is formed of a metal plate member, the biaxial hinge mechanism 20 can be made thin while securing strength. This allows for a further reduction in thickness of the display unit side body 3.

In addition, in the biaxial hinge mechanism 20, the holding arm portions 21b extending in a longitudinal direction of the display unit side body 3 are connected to both end portions of the support arm portion 21a of the connection arm 21. The connection arm 21 has a channel shape with the holding arm portions 21b. In the connection arm 21 having a channel shape, the support arm portion 21a supports a lower end face of the display 30 and the holding arm portions 21 support both side faces of a bottom portion of the display 30. Therefore, the connection arm 21 wraps and holds the lower end portion and a peripheral portion thereof of the display 30, thereby fixing the display 30. In this case, the display 30 can be fixed without the abovementioned fastening screws 28.

In other words, when a user holds the display unit side body 3 and rotates the display unit side body 3 about the pivot axis Y with respect to the operation unit side body 2, the connection arm 21, the front case 3a, and the rear case 3b can sufficiently transfer a force.

It should be noted that a length L2 of the holding arm portions 21b (see FIG. 8) is defined so as to satisfy bending precision of the connection arm 21 and the stiffness of the support frame 33. The length L2 of the holding arm portions 21b is preferably substantially the same as a length L1 of the support arm portion 21a. In a case where the holding arm portions 21b extends in a longitudinal direction of the display 30 such that the length L2 of the holding arm portions 21b is greater than the length L1 of the support arm portion 21a, the stiffness of the support frame 33 becomes greater. On the other hand, since the bending precision of the connection arm 21 is limited, the connection arm 21 warps with respect to a surface of the display 30.

On the contrary, if the holding arm portions 21b are shaped to surround the display 30, the stiffness of the holding arm portions 21b can be secured while avoiding misalignment in an end portion thereof. However, such a shape of the holding arm portions 21b cannot be formed with a metal plate and requires processing by die casting. This may result in a negative impact on the reduction in thickness of the body and reduction in manufacturing cost of the electronic apparatus.

It should be noted that, it is a matter of course that the operation unit side body 2 may be configured as the body rotating about the pivot axis Y and the display unit side body 3 may be configured as another body.

The invention claimed is:

1. A portable electronic apparatus comprising:
a first body that is a substantially flat plate shape; and
a second body that is connected to the first body via a hinge portion, wherein:
the hinge portion includes a first rotational axis that makes the first body transition between an opened state and a closed state with respect to the second body, and a second rotational axis that rotates the first body with respect to the second body by way of an axis orthogonal to the first rotational axis, such hinge portion is configured by providing a fixed portion that extends in a direction orthogonal to an axial direction of the second rotational axis and rotates about the second rotational axis;
the second body is fixed to the hinge portion so as to rotate about the first rotational axis;
the first body is fixed to the hinge portion so as to be rotatable about the second rotational axis by tightening together the fixed portion to a component constituting the first body with a screw in a direction orthogonal to a thickness direction of the first body,
wherein both end portions of the fixed portion in a direction orthogonal to the axial direction of the second rotational axis extend inside the first body in a direction parallel to the second rotational axis.

2. The portable electronic apparatus according to claim 1, wherein the screw is used plural number.

3. The portable electronic apparatus according to claim 2, wherein the fixed portion includes threaded holes at point-symmetrical positions about the second rotational axis.

4. The portable electronic apparatus according to claim 1, wherein the fixed portion is a component that can be obtained by bending a metal plate of which a thickness direction is in the axial direction of the second rotational axis.

5. The portable electronic apparatus according to claim 4, wherein the fixed portion is formed in a shape that is symmetrical about the axial direction of the second rotational axis and that surrounds at least a portion of an inner component of the first body.

6. The portable electronic apparatus according to claim 5, wherein the inner component is a display.

7. The portable electronic apparatus according to claim 1, wherein the fixed portion is a component that can be obtained by bending a metal plate of which a thickness direction is in the axial direction of the second rotational axis.

8. The portable electronic apparatus according to claim 1, wherein the fixed portion is formed in a shape that is symmetrical about the axial direction of the second rotational axis and that surrounds at least a portion of an inner component of the first body.

9. The portable electronic apparatus according to claim 8, wherein the inner component is a display.

10. A portable electronic apparatus comprising:
the fixed portion is formed in a shape that is symmetrical about the axial direction of the second rotational axis and that surrounds at least a portion of an inner component of the first body; and
the first body is fixed to the hinge portion so as to be rotatable about the second rotational axis by fixing the fixed portion to the first body;
wherein both end portions of the fixed portion extend inside the first body in a direction parallel to the second rotational axis.

11. The portable electronic apparatus according to claim 10, wherein the fixed portion includes threaded holes at point-symmetrical positions about the second rotational axis and is fixed by threads to a component constituting the first body.

12. The portable electronic apparatus according to claim 10, wherein the fixed portion is a component that can be obtained by bending a metal plate of which a thickness direction is in the axial direction of the second rotational axis.

* * * * *